United States Patent [19]

Stenwall

[11] 3,758,128
[45] Sept. 11, 1973

[54] COMBINED BEACH CHAIR AND SHOPPING CART

[76] Inventor: Lauri Stenwall, 28 White Ter., Ramsey, N.J. 07446

[22] Filed: June 24, 1971

[21] Appl. No.: 156,386

[52] U.S. Cl......... 280/47.25, 280/47.3, 280/DIG. 7, 297/129
[51] Int. Cl............................................. B62b 1/20
[58] Field of Search............... 280/30, 47.18, 47.25, 280/47.24, 47.26, 47.3, DIG. 3, DIG. 7, 8; 297/118, 129, DIG. 4

[56] References Cited
UNITED STATES PATENTS

| 2,065,233 | 12/1936 | Mallett | 280/47.25 |
| 646,869 | 4/1900 | Perkes | 280/DIG. 7 |
| 3,560,015 | 2/1971 | Tracy | 280/47.3 |
| 2,721,085 | 10/1955 | Powell | 280/30 X |
| 2,967,058 | 1/1961 | Hoffmann | 280/30 |
| D187,069 | 1/1960 | Schnapp | 280/47.18 X |
| 3,087,740 | 4/1963 | Mitty et al. | 280/47.26 |

FOREIGN PATENTS OR APPLICATIONS

| 948,865 | 2/1949 | France | 280/47.24 |
| 226,399 | 8/1962 | Austria | 280/47.25 |

Primary Examiner—Leo Friaglia
Assistant Examiner—Leslie J. Paperner
Attorney—Stefan J. Klauber

[57] ABSTRACT

A device which can be used either as a beach chair or a beach, shopping and laundry cart comprising an open frame having vertical and horizontal sections covered with webbing and having means for detachably storing packages to be transported.

4 Claims, 5 Drawing Figures

PATENTED SEP 11 1973 3,758,128

INVENTOR.
LAURI STENWALL

COMBINED BEACH CHAIR AND SHOPPING CART

SUMMARY OF THE INVENTION

My invention is directed toward an open frame having vertical and horizontal open sections covered with webbing. Wheels can be detachably secured to the bottom of the frame. The handle of the horizontal section has means for storing a bag, that would carry shopping bags, in a rolled up state. The foot section would support filled shopping bags.

With no bags and wheels removed, my invention can be used as a beach chair. With wheels attached with or without bags, my invention can be used as a beach, shopping or laundry cart as desired.

DETAILED DESCRIPTION OF PREFERRED EMBODIMENTS

Figure 1:
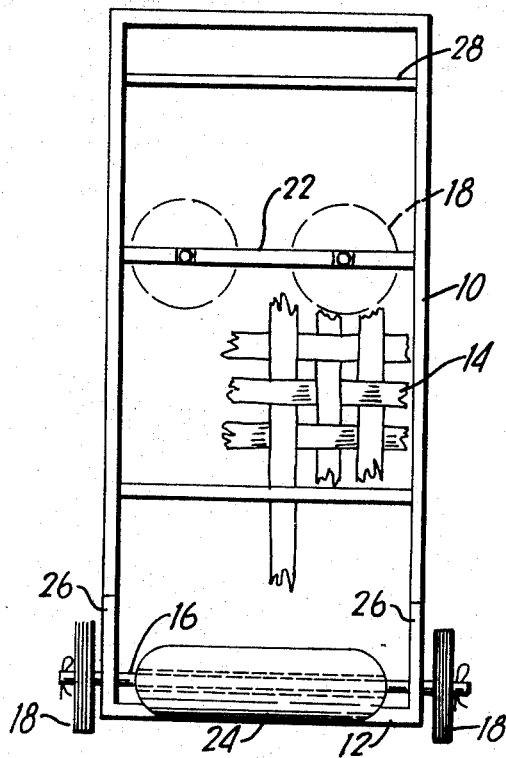
FIGS. 1 and 2 are front and rear view of my invention.
Figure 2:
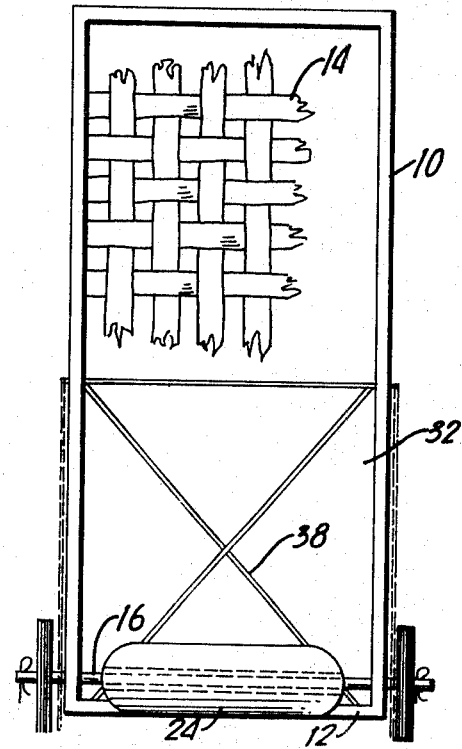
Figure 3:
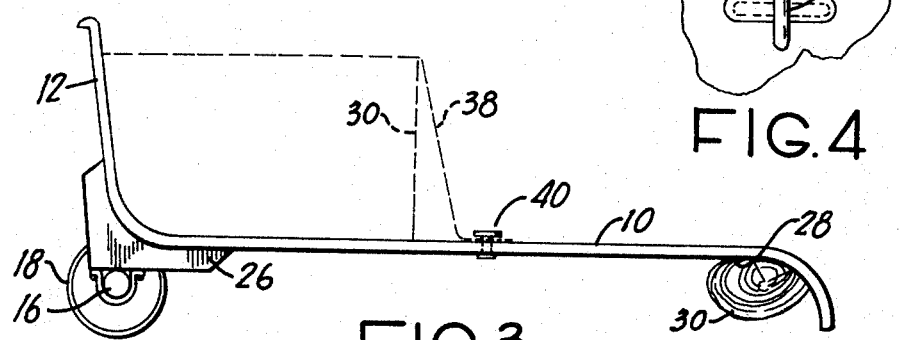
FIG. 3 is a side view of my invention.
Figure 4:
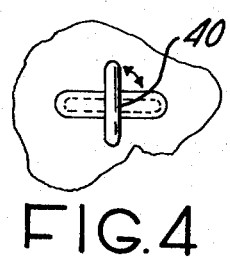
FIG. 4 is a detail view showing closure means used in my invention.
Figure 5:
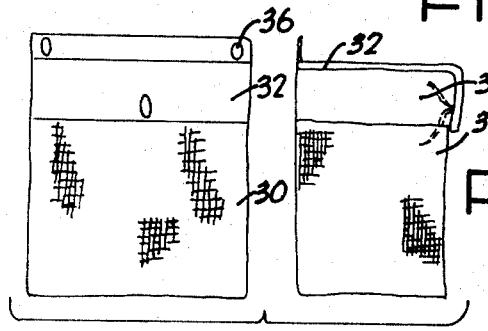
FIG. 5 shows front and side views of a protected shopping bag in accordance with my invention.

Referring now to FIGS. 1–5, a hollow frame formed of aluminum tubing has an open horizontal section 10 and an open vertical section 12. Both sections are covered with webbing 14. The bottom of the frame at the point where vertical and horizontal sections join carries a transverse horizontal axle 16.

Externally disposed hand wheels 18 can be secured detachably to the outer ends of the axle by cotter pins 20 or can be removed and held horizontally underneath a horizontal support member 22 extending transversely between opposite sides of section 12. An inflatable horizontal roller 24 is circumferentially disposed about axle 16 within the frame between axle stiffeners and supports 26 and is not removable.

A support bar with snaps 28 is secured to the underside of the horizontal section adjacent its downwardly curved foot to hold shopping bags or storage bags 30 in rolled up condition. When these bags are filled they can be placed on section 10 adjacent section 12. Section 12 has a flap 32 which can be extended to cover a filled bag for protection against rain with tie thongs 34 and also has holes 36. Strong cord 38 can be disposed in the holes and extend over the package and down to the section 10, being held detachably in place by twist fasteners 40.

My invention can then be used as chair or cart in the manner previously indicated.

While I have described my invention with particular reference to the drawings, such is not to be considered as limiting its actual scope.

Having thus described this invention, what is asserted as new is:

1. A combined chair and cart comprising:
    a hollow open frame having a vertical section and a relatively much longer horizontal section, said sections being in fixed relationship with respect to one another;
    webbing covering both sections of said frame; a horizontal axle extending transversely between the sides of the frame and disposed thereunder in a region common to both sections;
    axle stiffener and support means disposed on opposite sides of said frame in said region; an inflatable, elongated and generally cylindrical roller being disposed circumferentially and non-removably about the axle and extending horizontally between the support means; and
    a pair of wheels detachably securable to opposite ends of said axle at positions outside of the support means, the periphery of said wheels in the attached position extending radially with respect to said axle beyond the periphery of said roller.

2. The combination as set forth in claim 1, in which a horizontal support member extends transversely between opposite sides of said vertical open section to hold said wheels when detached from said axle.

3. The combination as set forth in claim 1 wherein said horizontal section is provided with means for holding rolled up storage bags.

4. The combination as set forth in claim 3 further including a flap secured to the vertical section for covering filled bags supported on the horizontal section.

* * * * *